(12) United States Patent
Wasson et al.

(10) Patent No.: US 6,450,194 B1
(45) Date of Patent: Sep. 17, 2002

(54) SPOOL NOTCH GEOMETRY FOR HYDRAULIC SPOOL VALVE

(75) Inventors: Jeffrey B. Wasson, Union Grove, WI (US); David W Swaim, Joliet, IL (US); George T. Fiala, Racine, WI (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/670,191

(22) Filed: Sep. 26, 2000

(51) Int. Cl.[7] .......................... F15B 13/04; F15B 13/08
(52) U.S. Cl. ................ 137/351; 137/625.3; 137/625.69
(58) Field of Search .................... 137/625.3, 625.69, 137/351

(56) References Cited

U.S. PATENT DOCUMENTS

| | | | | | |
|---|---|---|---|---|---|
| 3,198,212 | A | * | 8/1965 | Junck et al. | 137/625.69 X |
| 3,556,155 | A | * | 1/1971 | McWilliams et al. | 137/625.3 X |
| 3,747,642 | A | * | 7/1973 | Tolbert | 137/625.3 X |
| 3,750,690 | A | * | 8/1973 | Bubula et al. | 137/625.69 X |
| 3,866,627 | A | * | 2/1975 | Dezelan | 137/625.69 X |
| 4,009,864 | A | * | 3/1977 | Schexnayder | 137/625.3 X |
| 4,066,239 | A | * | 1/1978 | Hall | 137/625.3 X |
| 4,122,868 | A | * | 10/1978 | Holloway et al. | 137/625.3 X |
| 4,941,508 | A | * | 7/1990 | Hennessy et al. | 137/625.3 X |
| 5,074,335 | A | * | 12/1991 | Beuermann | 137/625.69 |
| 5,890,362 | A | * | 4/1999 | Wilke | 137/596.13 X |
| 5,996,623 | A | * | 12/1999 | Omberg | 137/625.69 X |
| 6,158,462 | A | * | 12/2000 | Kashiwagi et al. | 137/596.13 X |
| 6,397,890 | B1 | * | 6/2002 | Mickelson et al. | 137/625.69 |

* cited by examiner

*Primary Examiner*—Gerald A. Michalsky
(74) *Attorney, Agent, or Firm*—A. N. Trausch

(57) ABSTRACT

A spool valve includes a pressure control portion and a pair of flow control portions. Each flow control portion is adjacent to, and on opposite sides of, the pressure control portion. A first plurality of opposed notches are formed in the pressure control portion. The first plurality of notches have a first geometry. A second plurality of opposed notches are formed in each flow control portion. The second plurality of notches include at least one notch of a second geometry, different from the first geometry, and at least one notch of a third geometry, different from the first and second geometries.

7 Claims, 6 Drawing Sheets

SPOOL NOTCH GEOMETRY FOR HYDRAULIC SPOOL VALVE

BACKGROUND

The disclosures herein relate generally to spool valves and more particularly to spool notch geometries for low effort backhoe valve applications.

Spool valves assist in controlling hydraulic fluid flow in a hydraulic system. System pressure may be for example, 3100 psi. The spool valve function is to provide a desired balance in the system between pressure control and flow control. To accomplish this balance, a spool valve includes a plurality of notched lands and adjacent neck portions. There are notches provided to maintain pressure control and notches provided to maintain flow control. The spool valve moves in a fluid chamber so that the notches cooperate with surfaces of the chamber to maintain the pressure control and flow control by metering fluid flow through the chamber.

U.S. Pat. No. 4,862,920 discloses a spool for a spool valve. The spool includes at least one annular land having at least three intersecting notches in a side surface thereof. The form of each notch is non-cylindrical at its intersection with an adjacent notch.

In construction machinery, for example, to control the basic operation of the backhoe functions in a loader/backhoe machine, requires the use of a hydraulic system having a control valve capable of operating the desired functions with minimal effort exerted by the operator and maximum fine controllability by the valve components. The valve utilizes a spool which, when operated in a certain manner, directs hydraulic flow to other components in the system to control basic backhoe operations when desired. The spool has incorporated characteristics that define its respective control of flow with the output being shifting effort and flow metering capability. These characteristics are defined by the notches incorporated into the spool which typically are machined into the land locations.

Therefore, what is needed is a spool notch geometry which reduces effort exerted by the backhoe operator to the extent that the operator can feel the machine operations better, such as finding buried pipe, by reducing the effort such that the effort caused by flow forces in the valve are minimized and do not mask the true feel of the machine.

SUMMARY

One embodiment, accordingly, provides a spool including notch geometries which provide a fine tuned feel for more precise operation of hydraulic machinery. To this end, a spool valve includes a pressure control portion and a pair of flow control portions. Each flow control portion is adjacent to, and on opposite sides of, the pressure control portion. A first plurality of opposed notches are formed in the pressure control portion. The first plurality of notches have a first geometry. A second plurality of opposed notches are formed in each flow control portion. The second plurality of notches include at least one notch of a second geometry, different from the first geometry, and at least one notch of a third geometry, different from the first and second geometries.

A principal advantage of this embodiment is that the combination of notch geometries reduces the effort exerted by the operator to the extent that the operator can feel the machine operations better.

DETAILED DESCRIPTION

Figure 1:
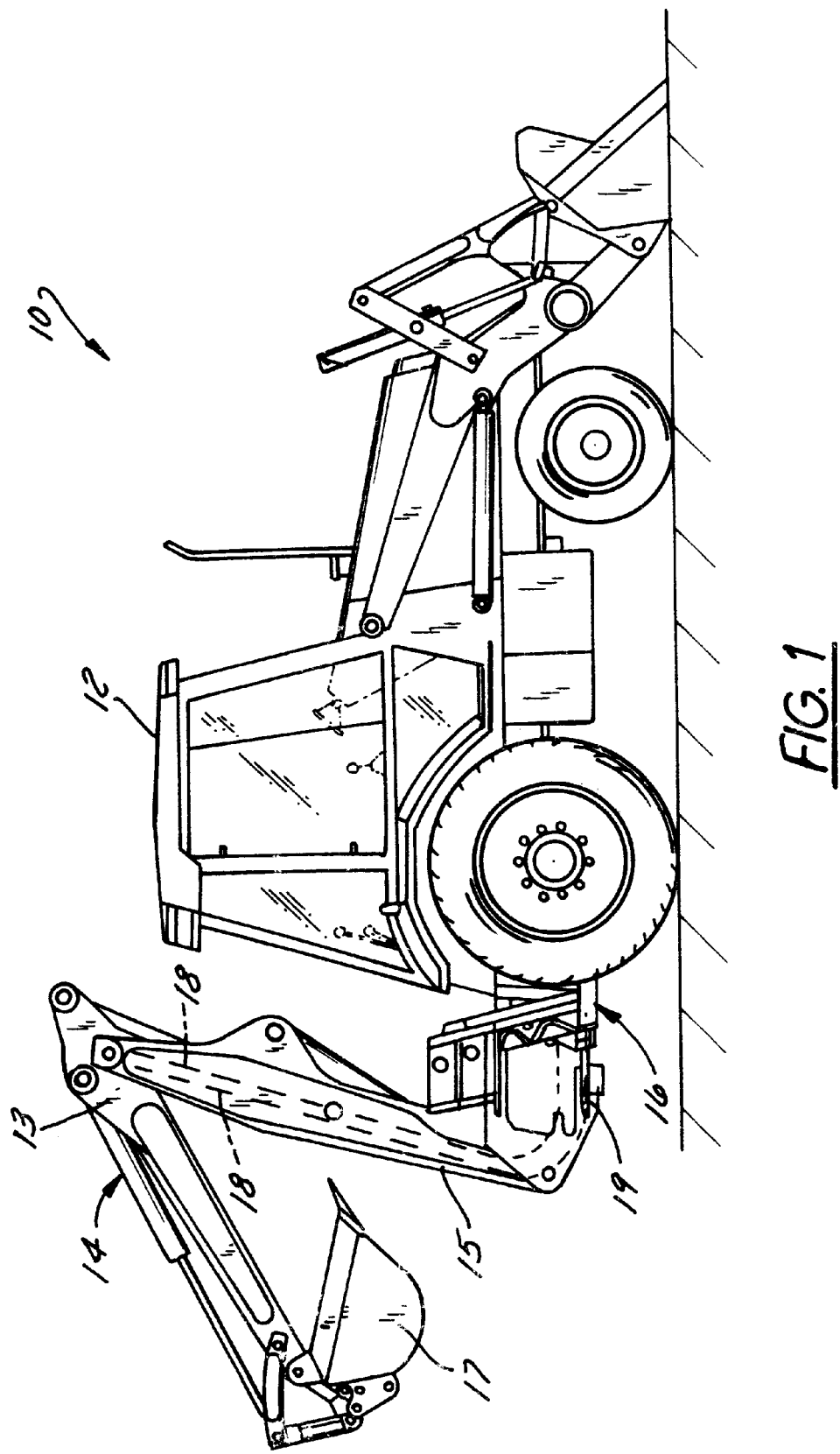
FIG. 1 is an exemplary view illustrating an embodiment of a construction machine having a spool valve assembly.

In FIG. 1, a construction machine is generally designated 10 and includes a vehicle 12 having a backhoe 14 operably attached thereto by a boom 15. A spool valve assembly 16 is mounted in vehicle 12 for assisting in controlling hydraulic operation of all elements of backhoe 14 by means of hydraulic lines 18. The backhoe elements include the boom 15, a dipper 13, a bucket 17 and a swing cylinder 19.

Figure 2:
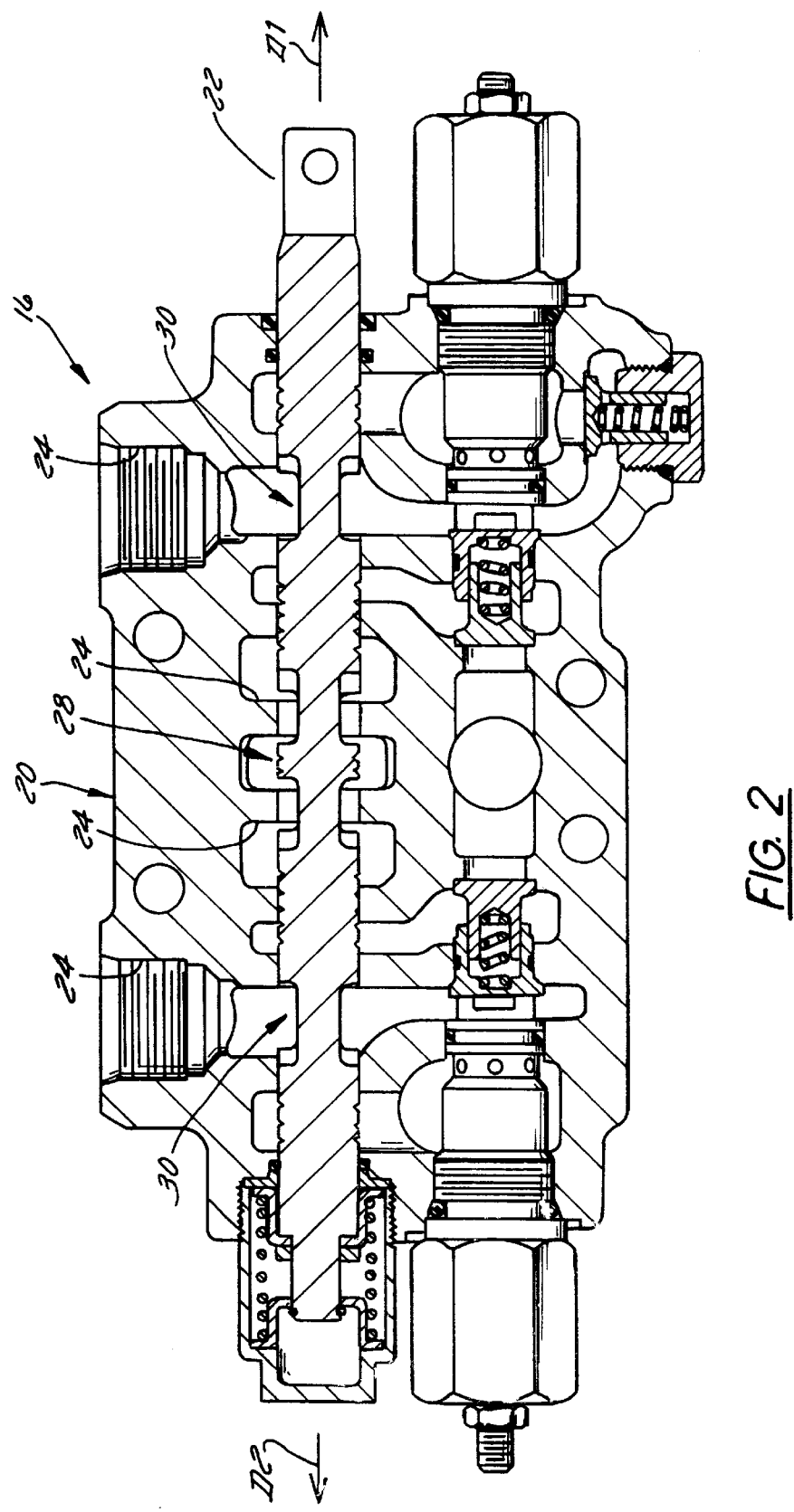
FIG. 2 is a cross-sectional view illustrating an embodiment of a spool valve assembly.

The spool valve assembly 16, FIG. 2, includes a spool valve housing 20 having a spool valve 22 reciprocably mounted therein. Spool valve 22 is movable from a neutral open center position as illustrated. Movement of operator control levers causes movement of spool valve 22 in the direction of arrow D1 to control a "raise" mode for backhoe 14, and movement of spool valve 22 in the direction of arrow D2 to control a "lower" mode for backhoe 14. The spool valve 22 moves relative to housing 20 for controlling hydraulic pressure and flow as hydraulic fluid flows through passages 24 in housing 20. This is accomplished by specifically shaped notches (discussed below) in spool valve 22 which move relative to adjacent surfaces of housing 20 to change the velocity profile of the fluid. The movement of the notches relative to the housing surfaces varies the amount and the velocity of fluid moving through the housing 20. This fluid flow translates to the speed at which the boom 15 is moved.

Figure 3:
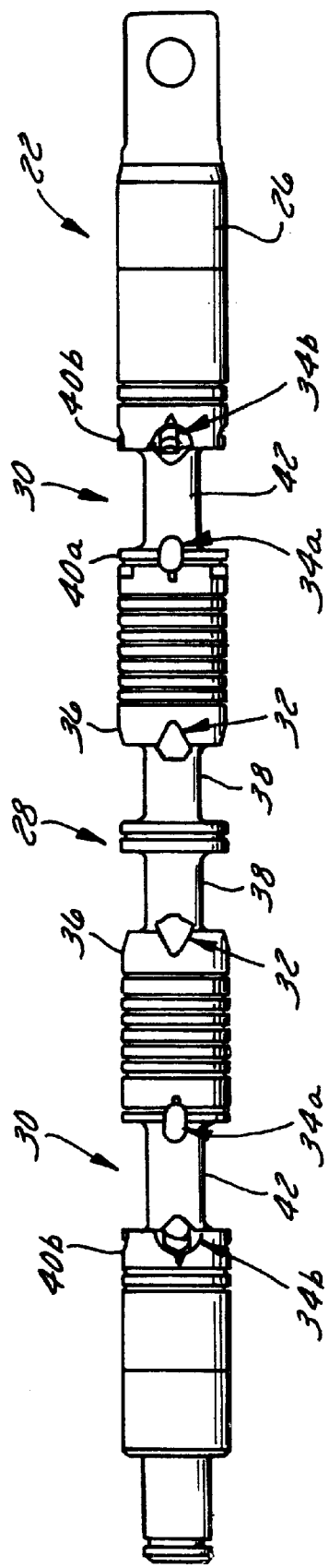
FIG. 3 is a side view illustrating an embodiment of a spool valve.

Spool valve 22, FIGS. 2 and 3, is formed from a shaft 26 including a pressure control portion 28 and a pair of flow control portions 30. Each flow control portion 30 is adjacent to, and on opposite sides of, the pressure control portion 28. A first plurality of opposed notches 32 are formed in the pressure control portion 28. Notches 32 are of a first geometry. A second plurality of opposed notches are formed in each flow control portion 30. The second plurality of notches include at least one notch 34a, of a second geometry which is different from the first geometry, and at least one notch 34b of a third geometry different from the first and second geometries.

In FIG. 3, the pressure control portion 28 includes a plurality of annular lands 36 which are spaced apart by a reduced diameter annular neck portion 38. Each land 36 includes at least one of the notches 32 of the first geometry. Each flow control portion 30 includes a plurality of annular lands 40a and 40b which are spaced apart by a reduced diameter annular neck portion 42. Each land 40a includes at least one of the notches 34a of the second geometry, and each land 40b includes at least one of the notches 34b of the third geometry.

Figure 4:
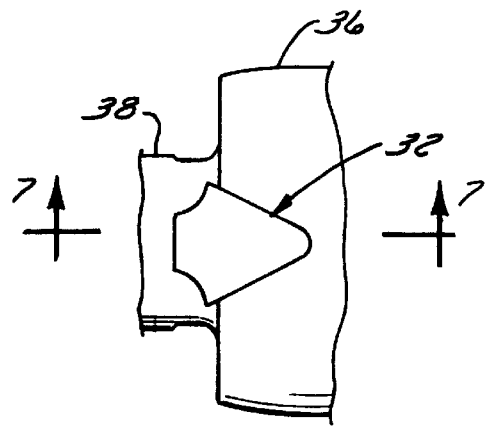
FIG. 4 is a plan view illustrating an embodiment of a spool valve notch.

In FIG. 4., each notch 32 of the first geometry is formed in its respective land 36 and has a depth (discussed below) which extends radially into its respective neck portion 38. In plan view, each notch 32 has a substantially wide angle wedge shape.

Figure 5:
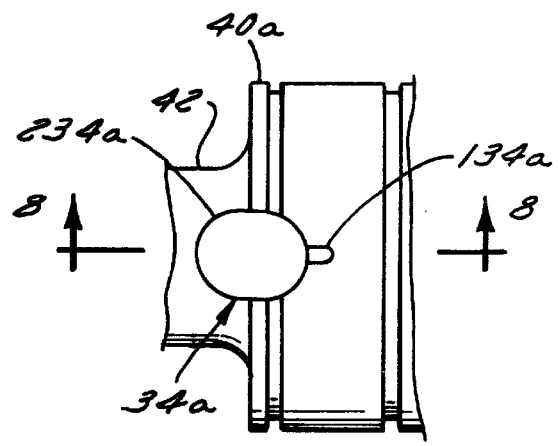
FIG. 5 is a plan view illustrating another embodiment of a spool valve notch.

In FIG. 5, each notch 34a of the second geometry is formed in its respective land 40a and has a first portion 134a provided for fluid communication with a second portion 234a. The first portion 134a has a first depth (discussed below) and the second portion 234a has a second depth (discussed below) which extends radially into its respective neck portion 42. In plan view, each first portion 134a is of a substantially smaller size than each second portion 234a.

Figure 6:
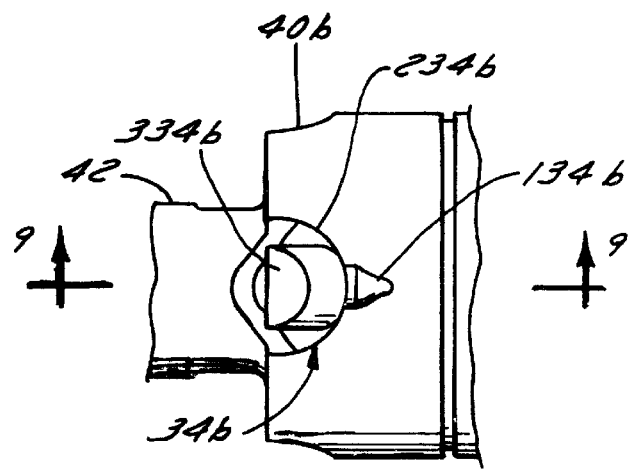
FIG. 6 is a plan view illustrating a further embodiment of a spool valve notch.

In FIG. 6, each notch 34b of the third geometry is formed in its respective land 40b and has a first portion 134b, provided for fluid communication with a second portion 234b and a third portion 334b. The second portion 234b has a depth (discussed below) which extends radially into its respective neck portion 42. In plan view, each first portion 134b is of a substantially smaller size than each second portion 234b, and each third portion 334b is a post notch. The second portion 234b is formed annularly around the post notch 334b.

Figure 7:
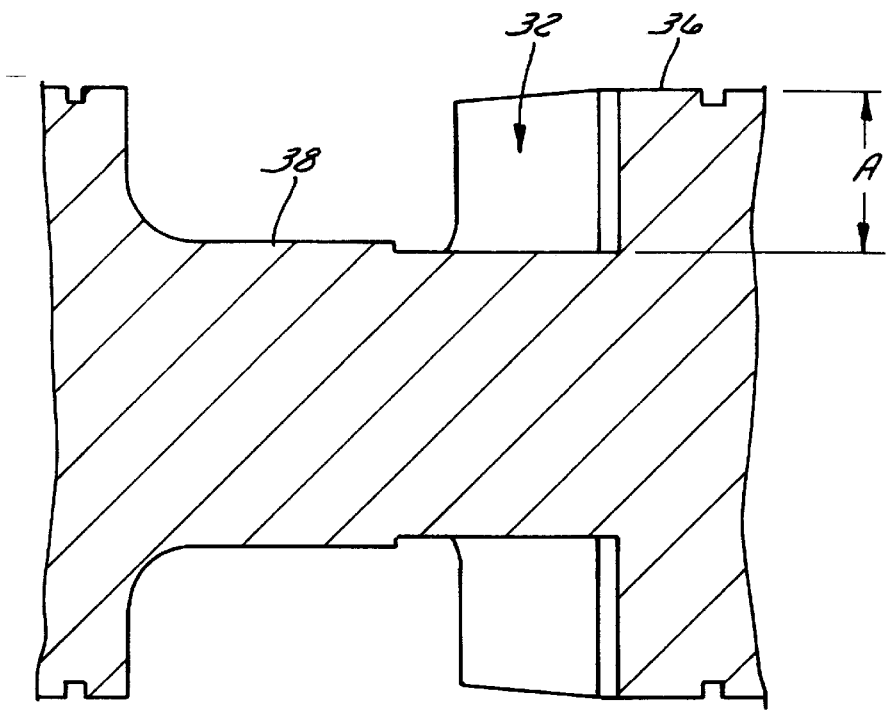
FIG. 7 is a partial cross-sectional view taken along the line 7—7 of FIG. 4.

In FIG. 7, each notch 32 of the first geometry is formed in its respective land 36 and has a depth A which extends radially to penetrate its annular neck portion 38.

Figure 8:
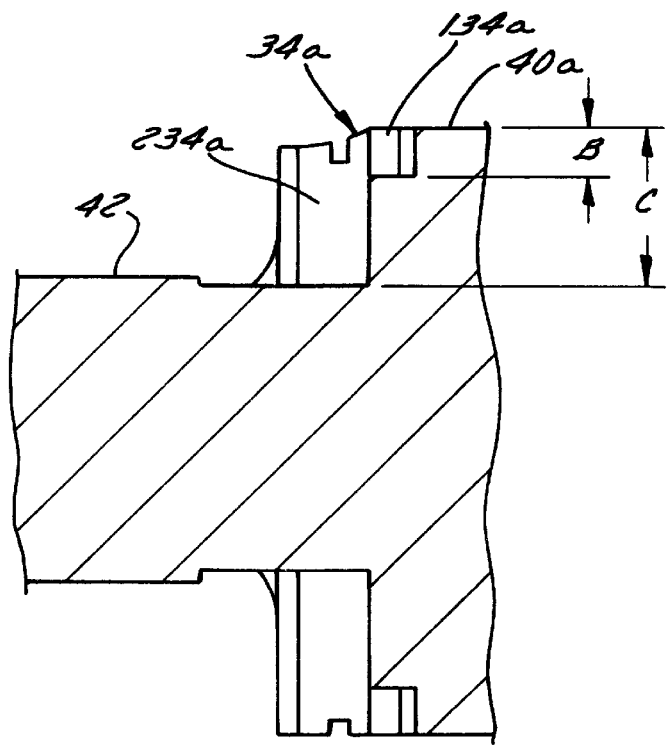
FIG. 8 is a partial cross-sectional view taken along the line 8—8 of FIG. 5.

In FIG. 8, each notch 34a of the second geometry is formed in its respective land 40a. The first portion 134a of each notch 34a has a depth B which extends partially into land 40a in a radial direction. The second portion 234a has a depth C which extends radially to penetrate its annular neck portion 42, and is greater than depth B.

Figure 9:
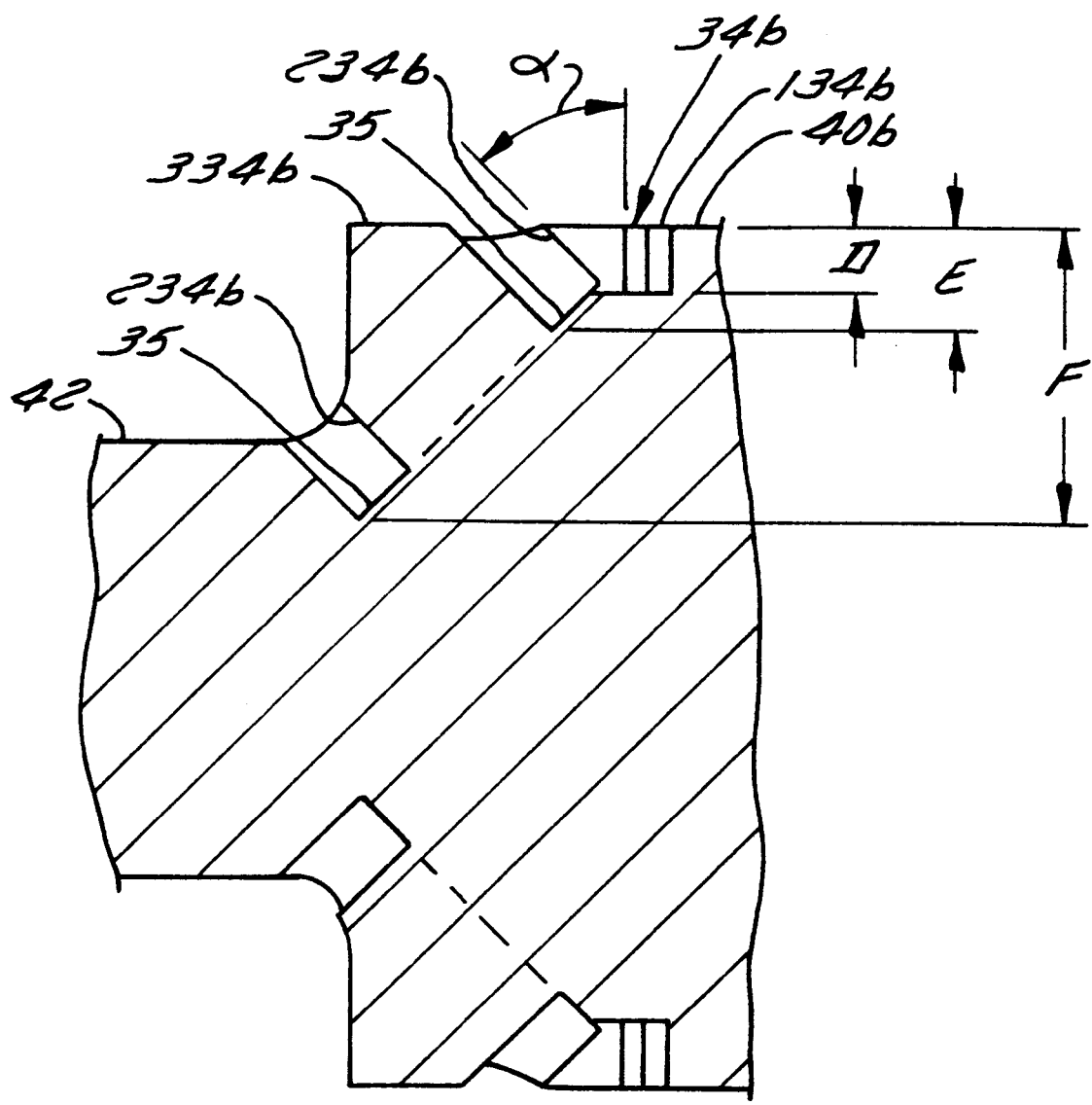
FIG. 9 is a partial cross sectional view taken along the line 9—9 of FIG. 6.

In FIG. 9, each notch 34b of the third geometry is formed in its respective land 40b. The first portion 134b of each notch 34b has a depth D which extends partially into land 40b in a radial direction. The second portion 234b is formed at an angle a relative to first portion 134b, has a sloped base 35 with a depth extending from E to F, which extends to penetrate its annular neck portion 42, and is greater than depth D. The second portion 234b is formed annularly around post 334b which extends co-axially within second portion 234b. In this manner, fluid flows through second portion 234b around post 334b.

As a result, one embodiment provides a spool valve which includes a shaft, a pressure control portion formed on the shaft and a pair of flow control portions formed on the shaft. Each of the flow control portions is positioned adjacent to, and on opposite sides of, the pressure control portion. A first plurality of opposed notches are formed in the pressure control portion and have a first geometry. A second plurality of opposed notches are formed in each flow control portion and include at least one notch of a second geometry, different from the first geometry, and at least one notch of the third geometry, different from the first and second geometries.

Another embodiment provides a spool valve assembly including a spool valve housing and a spool valve mounted in the housing. The spool valve includes a pressure control portion and a pair of flow control portions. Each of the flow control portions is positioned adjacent to, and on opposite sides of, the pressure control portion. A first plurality of opposed notches are formed in the pressure control portion and have a first geometry. A second plurality of opposed notches are formed in each flow control portion and include at least one notch of a second geometry, different from the first geometry, and at least one notch of a third geometry, different from the first and second geometries.

A further embodiment provides a construction machine including a vehicle, a backhoe operably connected to the vehicle, a spool valve housing mounted on the vehicle and a plurality of spool valves mounted in the housing. At least one of the spool valves is mounted in the housing operably connected to the backhoe and includes a pressure control portion and a pair of flow control portions. Each of the flow control portions is positioned adjacent to, and on opposite sides of, the pressure control portion. A first plurality of opposed notches are formed in the pressure control portion and have a first geometry. A second plurality of opposed notches are formed in each flow control portion and include at least one notch of a second geometry, different from the first geometry, and at least one notch of a third geometry, different from the first and second geometries.

As can be seen, the principal advantages of these embodiments are that a lower force is required to shift the spool by manipulation of control levers. There are smoother force changes in spool loads with changing hydraulic loads. This reduces operator fatigue and enhances accuracy of boom operation because of less correcting based on load changes. More work can be accomplished with less correcting which permits more productivity. Also, because the machine is more controllable, the learning curve for operators is shortened.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A spool valve comprising:

a shaft;

a pressure control portion formed on the shaft, wherein the pressure control portion includes a pair of opposed annular lands spaced apart by a first reduced diameter annular neck portion;

a pair of flow control portions formed on the shaft, each flow control portion being adjacent to, and on opposite sides of, the pressure control portion, wherein each of the flow control portions include a pair of opposed annular metering-in and metering-out lands spaced apart by a pair of second reduced diameter annular neck portions;

a first plurality of opposed notches formed in the pressure control portion, wherein the first plurality of opposed notches are formed in their respective opposed lands and extend radially into the first neck portion, the first plurality of notches being of a V-shaped wedge first geometry; and a second plurality of opposed notches formed in each flow control portion, wherein each of the second plurality of opposed notches are formed in their respective opposed metering-in lands and extend radially into the respective second neck portions, the second plurality of notches including at least one notch having an end-milled, two tiered shape of a second geometry, different from the first geometry, wherein the first tier of the notch of the second geometry has a first depth, and the second tier of the notch of the second geometry has a second depth, wherein the second depth extends into the second neck portion and is greater than the first depth; and a third plurality of opposed notches formed in each flow control portion, wherein each of the third plurality of opposed notches are formed in their respective opposed metering-out lands and extend radially into the respective second neck portions, the third plurality of notches including at least one notch with a hollow end-milled and center post shape of a third geometry, different from the first and second geometries.

2. The spool valve as defined in claim 1 wherein each notch of the third geometry includes a first portion, a second portion and a third portion.

3. The spool valve as defined in claim 2 wherein the first portion of the notch of the third geometry has a first depth, the second portion of the notch of the third geometry has a second depth greater than the first depth, and the third portion of the notch of the third geometry is a post notch.

4. The spool valve as defined in claim 3 wherein the second depth extends into the neck portion.

5. The spool valve as defined in claim 4 wherein the second and third portions of the notch of the third geometry are formed at an angle with respect to the first portion of the notch of the third geometry.

6. A spool valve assembly comprising:

a spool valve housing;

a spool valve mounted in the housing, the valve including a shaft;

a pressure control portion formed on the shaft, wherein the pressure control portion includes a pair of opposed annular lands spaced apart by a first reduced diameter annular neck portion;

a pair of flow control portions formed on the shaft, each flow control portion being adjacent to, and on opposite sides of, the pressure control portion, wherein each of the flow control portions include a pair of opposed annular metering-in and metering-out lands spaced apart by a pair of second reduced diameter annular neck portions;

a first plurality of opposed notches formed in the pressure control portion, wherein the first plurality of opposed notches are formed in their respective opposed lands and extend radially into the first neck portion, the first plurality of notches being of a V-shaped wedge first geometry; and a second plurality of opposed notches formed in each flow control portion, wherein each of the second plurality of opposed notches are formed in their respective opposed metering-in lands and extend radially into the respective second neck portions, the second plurality of notches including at least one notch having an end-milled, two tiered shape of a second geometry, different from the first geometry, wherein the first tier of the notch of the second geometry has a first depth, and the second tier of the notch of the second geometry has a second depth, wherein the second depth extends into the second neck portion and is greater than the first depth; and a third plurality of opposed notches formed in each flow control portion, wherein each of the third plurality of opposed notches are formed in their respective opposed metering-out lands and extend radially into the respective second neck portions, the third plurality of notches including at least one notch with a hollow end-milled and center post shape of a third geometry, different from the first and second geometries.

7. A construction machine comprising:

a vehicle;

a backhoe operably connected to the vehicle;

a spool valve housing mounted in the vehicle;

a plurality of spool valves mounted in the housing, at least one of the valves being operably connected to the backhoe and including a shaft;

a pressure control portion formed on the shaft, wherein the pressure control portion includes a pair of opposed annular lands spaced apart by a first reduced diameter annular neck portion;

a pair of flow control portions formed on the shaft, each flow control portion being adjacent to, and on opposite sides of, the pressure control portion, wherein each of the flow control portions include a pair of opposed annular metering-in and metering-out lands spaced apart by a pair of second reduced diameter annular neck portions;

a first plurality of opposed notches formed in the pressure control portion, wherein the first plurality of opposed notches are formed in their respective opposed lands and extend radially into the first neck portion, the first plurality of notches being of a V-shaped wedge first geometry; and a second plurality of opposed notches formed in each flow control portion, wherein each of the second plurality of opposed notches are formed in their respective opposed metering-in lands and extend radially into the respective second neck portions, the second plurality of notches including at least one notch having an end-milled, two tiered shape of a second geometry, different from the first geometry, wherein the first tier of the notch of the second geometry has a first depth, and the second tier of the notch of the second geometry has a second depth, wherein the second depth extends into the second neck portion and is greater than the first depth; and a third plurality of opposed notches formed in each flow control portion, wherein each of the third plurality of opposed notches are formed in their respective opposed metering-out lands and extend radially into the respective second neck portions, the third plurality of notches including at least one notch with a hollow end-milled and center post shape of a third geometry, different from the first and second geometries.

* * * * *